United States Patent [19]

Liu et al.

[11] 4,033,823

[45] July 5, 1977

[54] PROCESS TO PRODUCE LYSOCELLIN

[75] Inventors: Chao-Min Liu, Cedar Grove;
Norberto Palleroni, North Caldwell;
Theron Hermann, Bloomfield;
Barbara Prosser, Newark, all of N.J.

[73] Assignee: Hoffmann-La Roche Inc., Nutley, N.J.

[22] Filed: Aug. 12, 1976

[21] Appl. No.: 713,754

[52] U.S. Cl. .............................................. 195/80 R
[51] Int. Cl. .............................................. C12D 9/14
[58] Field of Search ................................... 195/80 R

[56] References Cited
OTHER PUBLICATIONS

Ebata et al., The Journal of Antibiotics, Feb. 1975, vol. 28, No. 2, pp. 118–121.

*Primary Examiner*—Lionel M. Shapiro
*Attorney, Agent, or Firm*—Samuel L. Welt; George M. Gould; Frank P. Hoffman

[57] ABSTRACT

A fermentation process is disclosed wherein the known antibiotic lysocellin is produced by the fermentation of a new species of Streptomyces denominated as *Streptomyces longwoodensis* (X-14537).

1 Claim, No Drawings

PROCESS TO PRODUCE LYSOCELLIN

BACKGROUND OF THE INVENTION

The present invention is directed to the fermentation of a novel species of Streptomyces known as *Streptomyces longwoodensis* (X-14537) to produce the known polyether antibiotic lysocellin.

The polyether antibiotic lysocellin was first reported by Ebata et al. in J. Antibiotics, No. 2, Vol. 28, pp. 118-121 (1975).

The sodium salt of lysocellin forms colorless needles and melts at 158° − 160° C. The optical rotation is $[\alpha]_D^{25} + 11.5°$ (c 1, methanol) and the compound exhibits an absorption maximum of low intensity at 292 nm $(E_1^{1\%}{}_{cm} 0.68$ in ethanol).

In infrared spectrum (KBr), characteristic bands were observed at 3450–3300 cm$^{-1}$ corresponding to hydroxyl group; 2960 and 2930 cm$^{-1}$ corresponding to methyl and methylene groups; 1710 and 1590 cm$^{-1}$ corresponding to carbonyl groups. Elementary analysis and measurement of the molecular weight (656) by the vapor pressure equilibrium method indicated a molecular formula $C_{34} \cdot C_{34}H_{59}O_{10}Na \cdot \frac{1}{2}H_2O$ (molecular weight 659) for sodium salt of lysocellin.

Calcd. for $C_{34}H_{59}O_{10}Na \cdot \frac{1}{2}H_2O$: C, 61.88; H, 9.18; O, 25.46; Na 3.48. Found: C, 61.58; H, 9.10; O, 25.05; Na, 3.37.

Lysocellin is a monocarboxylic acid with pKa' of 6.6 when titrated in 66% dimethylformamide. The sodium salt of lysocellin is soluble in methanol, ethanol, n-butanol, ethyl acetate, benzene and chloroform, and insoluble in water. Lysocellin is stable in neutral solution but labile in acidic solution.

It produces a positive reaction to 2,4-dinitrophenyl-hydrazine and turns brown with concentrated sulfuric acid. The compound gives negative reactions to potassium permanganate, ferric chloride and MOLISCH reactions. On thin-layer chromatograms of silica gel, the following Rf values were observed: 0.54 with ethyl acetate, 0.30 with benzene-methanol (9:1), 0.63 with chloroform-methanol (9:1).

BIOLOGICAL PROPERTIES

Antimicrobial activities of lysocellin are listed in Table I. Lysocellin is active against gram-positive bacteria, antibiotic resistant *Staphylococcus aureus*, and is also active against some fungi, but it is not active against gram-negative bacteria. When *Bacillus subtilis* was grown on liquid medium, lysocellin caused bacterial lysis.

Lysocellin was inactive against *staphylococcus aureus* infection in mice when given by intraperitoneal administration. The LD$_{50}$ of this antibiotic is about 70 mg/kg, given intraperitoneally in mice.

Table 1.

| Antimicrobial spectra of lysocellin | |
|---|---|
| Microorganisms | Minimum inhibitory Concentration (µg/ml) |
| *Staphylococcus aureus* FDA 209P | 10 |
| Antibiotic resistant *S. aureus*[1] | 4 |
| *Sarcina lutea* | 10 |
| *Bacillus subtilis* | 10 |
| *Mycobacterium smegmatis* | 20 |
| *Escherichia coli* | >100 |
| Antibiotic resistant *E. coli*[2] | >100 |
| *Shigella dysenteriae* | >100 |
| *Salmonella typhimurium* | >100 |
| *Pseudomonas aeruginosa* | >100 |
| *Botrytis cinerea* | 50 |
| *Helminthosporium oryzae* | 50 |
| *Fusarium oxysporum* | 100 |
| *Alternaria kikuchiana* | 100 |

[1]Resistant to streptomycin, erythromycin, chloramphenicol and penicillin.
[2]Resistant to streptomycin, chloramphenicol, kanamycin, tetracycline and sulfonamide.

Lysocellin has the following structural formula:

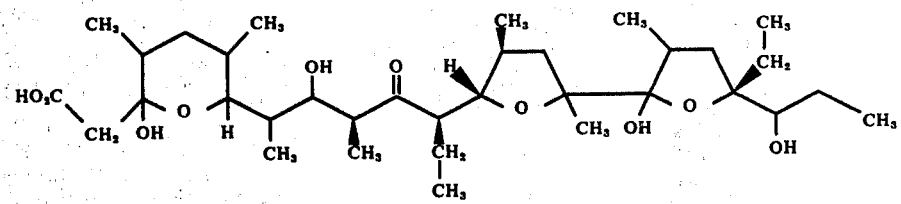

The microorganism X-14537 was isolated by K. Reichelt in 1972 from a soil sample collected from Longwood Gardens, Kennett Square, Pa. Tne microorganism is on deposit at the American Type Culture Collection, Rockville, Md., with the designation ATCC 29251.

X-14537 produces a substrate mycelium, which does not fragment into spores, and an aerial mycelium which later forms spore chains. After 14 days of incubation at 28° C., the spore chains are spira in form with greater than 10 spores per chain (range: 5 to > 50). Spores are smooth and range in size from 1.20 × 0.32 µ to 1.80 × 0.74 µ. The cell wall contains the isomer of diaminopimelic acid, other than the meso form. The above characteristics place the organism in the genus Streptomyces [Lechevalier et al., "Chemical Composition as a Criterion in the Classification of Actinomycetes", In Adv. Appl. Microbiol., 14:47-72 (1971)].

The organism was cultivated on standard ISP media (Difco) as described by Shirling and Gottlieb (Shirling, E. B., and D. Gottlieb, 1966. Methods for Characterization of Streptomyces species. Int. J. Syst. Bacteriol. 16:313-340), as well as on the media used for the following tests: sodium chloride tolerance (Gordon, R. E., and M. M. Smith. 1953. Rapidly growing, acid fast bacteria. J. Bacteriol. 66:41-48); decomposition of adenine, xanthine, tyrosine, and hypoxanthine (Gordon, R. E., 1967. The taxonomy of soil bacteria, p. 293-321. In T. R. G. Gray and D. Parkinson, ed., Ecology of soil bacteria. Liverpool University Press, Liverpool); hydrolysis of hippurate [Gordon, R. E., and A. C. Horan. 1968. A piecemeal description of *Streptomyces griseus* (Krainsky) Waksman and Henrici. J. Gen. Microbiol. 50:223-233] and casein (Gordon, R. E., and M. M. Smith. 1953. Rapidly growing, acid fast bacteria. J. Bacteriol. 66:41-48); peptonization of skim milk [Gordon and Smith. 1953. Rapidly growing, acid fast bacteria. J. Bacteriol. 66:41-48 (modified without agar)]; hydrolysis of starch (actinomyces broth

[Difco] plus 0.25% soluble starch and 2.0% agar); and gelatin hydrolysis (Skerman, V. B. D. 1967. A guide to identification of the genera of bacteria. The Williams and Wilkins Co. Baltimore), modified with actinomyces broth [Difco] plus 2.0% agar in place of meat infusion agar); and reduction of nitrate (Gordon, R. E. and M. M. Smith. 1953. Rapidly growing, acid fast bacteria. J. Bacteriol. 66:41–48). All tests were run at 28° C. Color determinations were made after 2 weeks of incubation.

Carbon utilization was determined by the method of Shirling and Gottlieb (Shirling, E. B., and D. Gottlieb. 1966. Methods for characterization of Streptomyces species. Int. J. Syst. Bacteriol. 16:313–340). A 24-h old ISP-1 broth culture of the organism was homogenized and centrifuged to obtain a washed suspension for inoculation. The ability of the organism to grow at 10, 28, 37, 45, and 50° C was investigated by inoculating broth of ISP-1 (Difco) medium. Cell wall analysis was performed by the method of Becker et al (Becker, B., M. P. Lechevalier, R. E. Gordon, and H. A. Lechevalier. 1964. Rapid differentiation between Nocardia and Streptomyces by paper chromatography of whole-cell hydrolysates. Appl. Microbiol. 12:421–423).

Macroscopic examination. In Table 1 are summarized the amount of growth, degree of sporulation, spore mass color, color of reverse-substrate mycelium, and presence of a soluble pigment produced by strain X-14537 on various solid media.

TABLE 1.

| Agar Medium | Amount of Growth Degree of Sporulation | Spore Mass Color[a] | Color of reverse-substrate mycelium[a] |
|---|---|---|---|
| Yeast malt extract (ISP-2)[b] | Moderate to abundant growth, well sporulated | Mostly 2fe (covert gray); tufts of b (oyster white) | 3ni (clove brown) at center, 3ie (camel) at edge |
| Oatmeal (ISP-3)[b] | Moderate growth; well sporulated | Between 2fe (covert gray) and 3fe (silver gray) | 2dc (natural string) |
| Inorganic salts starch (ISP-4)[b] | Moderate growth; moderate sporulation | c (light gray) toward center, 2fe (covert gray) at edge | 2dc (natural string) at center 2ba (pearl) at edge |
| Glycerol asparagine (ISP-5)[b] | Poor growth; moderate to sparse sporulation | 3fe (silver gray) where dense growth; 2fe (covert gray) where isolated colonies | 3ig (beige brown) where dense growth 3gc (light tan) where isolated colonies |
| Czapek-Dox[c] | Moderate growth; sparse sporulation | e (gray) where densely sporulated; 2dc (natural) where sparsely sporulated | 3fe (silver gray) |
| Bennett[d] | Moderate growth well sporulated | 2ba (pearl) where densely sporulated; d (light gray) where sparsely sporulated | 3ni (clove brown) where dense; 3ie (camel) at edge |
| Sabouraud dextrose (Difco) | Poor growth; sparse sporulation | 2ba (pearl) where sporulated | 2gc (covert tan) |
| Thermoactinomyces fermentation medium[e] | Moderate to abundant growth; well sporulated, slightly hygroscopic | Mostly 2fe (covert gray); with some b (oyster white) | 3lg (mustard tan) toward center; 3ie (camel) toward edge |
| Sporulation (ATCC medium 5)[f] | Moderate growth; well sporulated; some isolated non-sporulated colonies | Mostly 2fe (covert gray); some isolated colonies of 3ba (pearl) | 3pn (dark brown) toward center, 2ih (dark covert gray) and 2ba (pearl) at edge |
| Amidex[g] | Moderate growth; moderate to abundant sporulation | Mostly 2fe (covert gray) with some areas of a (white) | 3pl (mustard brown) toward center, 3lg (adobe brown) at edge |
| Starch casein[h] | Moderate growth; moderate to abundant sporulation | d (light gray) with tufts of b (oyster white) | 2gc (covert tan) |

[a]The color scheme used was that taken from the "Color Harmony Manual", 4th ed., 1958 (Container Corporation of America).
[b]Media recommended by the International Streptomyces Project (Shirling, E.B., and D. Gottlieb. 1966. Methods for characterization of Streptomyces species. Int. J. Syst. Bacteriol. 16:313–340).
[c]Czapek-Dox broth (BBL) to which 1.5% agar was added.
[d]"Thermoactinomyces" fermentation medium (Difco) to which 1.5% agar was added. This medium is no longer commercially available. The composition according to Difco is as follows: tryptone, 0.5%; yeast extract, 0.2%; Soytone, 0.2%; white potato dextrin, 1.5%; D-mannitol, 0.5%, $MgSO_4$, 0.02%; $Fe(NH_4)_2SO_4$, 0.001%; $ZnCl_2$, 2.1 μg/l; $MnCl_2$, 1.8 μg/l; $CuSO_4$, 0.2 μg/l; $Co(NO_3)_2$, 0.5 μg/l; $H_3BO_3$, 0.6 μg/l; pH 7.2. (Casein hydrolysate from Humko-Sheffield Chemical Co., Lyndhurst, N.J.)
[e]Yeast extract, 0.1%; beef extract, 0.1%; N-Z-amine (Casein hydrolysate from Humko-Sheffield Chemical Co., Lyndhurst, N.J.), 0.2%; glucose, 1.0%; pH 7.3.
[f]American Type Culture Collection Catalogue of Strains, 12th ed., 1976. (American Type Culture Collection, Rockville, Md.)
[g]Amidex (Corn Products Co., Decatur, Ill.), 1%; N-Z-amine A Casein hydrolysate from Humko-Sheffield Chem. Co., Lyndhurst, N.J.), 0.2%; beef extract, 0.1%; yeast extract, 0.1%; $CaCl_2 \cdot 2H_2O$, 0.0014%; agar, 2%; pH 7.3.
[h]Soluble starch, 1%; casein, 0.1%; $K_2HPO_4$, 0.05%; $MgSO_4$, 0.05%; agar, 1.5%; pH 7.4.

Table 2 reports the results of carbon utilization by strain X-14537.

TABLE 2.

| Carbon utilization by strain X-14537 | |
|---|---|
| Carbon source | Growth response[a] of: X-14537 |
| D-Glucose | ++ |
| D-Xylose | ++ |
| L-Arabinose | ++ |
| L-Rhamnose | — |

TABLE 2.-continued

Carbon utilization by strain X-14537

| Carbon source | Growth response* of: X-14537 |
|---|---|
| D-Fructose | ++ |
| D-Galactose | ++ |
| Raffinose | ± to − |
| D-Mannitol | ++ |
| i-Inositol | ++ |
| Salicin | + |
| Sucrose | − |
| Cellulose | − |

*Negative response; ±, doubtful response; +, more growth than on carbon control but less than on glucose; ++, positive response equal to the amount of growth on glucose.

Physiological characteristics. Strain X-14537 did not hydrolyze hippurate; it decomposed adenine, hyposanthine, and tyrosine but not xanthine, and it slowly peptonized skim milk.

Table 3 lists other diagnostically important properties.

TABLE 3.

Metabolic characteristics of strain X-14537

| Test | X-14537 |
|---|---|
| ISP-6 darkening | + |
| Melanin, ISP-7 | − |
| Casein hydrolysis | + |
| Gelatin hydrolysis | − |
| Starch hydrolysis | + |
| NaCl(%) tolerance | 5 |
| Growth range temp (° C) | 10–45 |
| ISP-1 darkening | + |
| Reverse-side pigment | − |
| Soluble pigment | − |
| Streptomycin sensitivity (10-μg disk) | + |
| Lysocellin production | + |
| Nitrate reduction | − |
| Hygroscopic property | Slight on Thermoactinomyces fermentation agar |

Using the above criteria of gray spore mass color, spiral sporophore, smooth spore surface, absence of melanin production on tyrosine, and carbon utilization, a comparison with Bergey's manual (Buchanan, R. E., and N. E. Gibbons, ed. 1974. Bergey's Manual of Determinative Bacteriology. 8th ed. Williams and Wilkins Co., Baltimore, Md. pp. 748–829), H. Nonomura's key for classification (Nonomura, W. 1974. Key for classification and identification of 458 species of Streptomycetes included in ISP. J. Ferment. Technol. 52:78–92), and Pridham and Lyons (Pridham, T. G. and A. J. Lyons, Jr. 1969. Progress in classification of the taxonomic and nomenclatural status of some problem Actinomycetes. In Developments in Industrial Microbiology 10:183–221), classification revealed no organism with similar characteristics; therefore it can be classified as a new species.

The species Streptomyces longwoodensis described herein includes all strains of Streptomyces which form a compound of the Formula I and which cannot be definitely differentiated from the culture streptomyces longwoodensis and its subcultures including mutants and variants. The compound of the Formula I is identified herein and after this identification is known, it is easy to differentiate the strains producing a compound of the Formula I from others.

*Streptomyces longwoodensis*, when grown under suitable conditions, produces a compound of the Formula I. A fermentation broth containing *Streptomyces longwoodensis* is prepared by inoculating spores or mycelia of the organism producing the compound of the Formula I into a suitable medium and then cultivating under aerobic conditions. For the production of a compound of the Formula I, cultivation on a solid medium is possible but for production in large quantitites, cultivation in a liquid medium is preferable. The temperature of the cultivation may be varied over a wide range, 20°–35° C within which the organism may grow but a temperature of 26°–30° C and a substantially neutral pH are preferred. In the submerged aerobic fermentation of the organism for the production of a compound of the Formula I, the medium may contain as the source for carbon, a commercially available glyceride oil or a carbohydrate such as glycerol, glucose, maltose, lactose, dextrin, starch, etc. in pure or crude states and as the source of nitrogen, an organic material such as soybean meal, distillers' solubles, peanut meal, cotton seed meal, meat extract, peptone, fish meal, yeast extract, corn steep liquor, etc. and when desired inorganic sources of nitrogen such as nitrates and ammonium salts and mineral salts such as ammonium sulfate, magnesium sulfate and the like. It also may contain sodium chloride, potassium chloride, potassium phosphate and the like and buffering agents such as sodium citrate, calcium carbonate or phosphates and trace amounts of heavy metal salts. In aerated submerged culturing procedures, an anti-foam agent such as liquid paraffin, fatty oils or silicone compounds is used. More than one kind of carbon source, nitrogen source or anti-foam source may be used for production of a compound of the Formula I.

The following Examples will serve to illustrate this invention without limiting it hereto.

Example 1

Fermentation

The lysocellin producing culture is grown and maintained on a starch-casein agar slant having the following composition (grams/liter distilled water):

| Soluble starch | 10.0 |
|---|---|
| Casein | 1.0 |
| K$_2$HPO$_4$ | 0.5 |
| MgSO$_4$ (anhydrous) | 0.5 |
| Agar | 20.0 |

Adjust to pH 7.4 with NaOH before autoclaving at 15–20 pound pressure for 20 minutes.

The slant is inoculated with lysocellin producing culture (Streptomyces X-14537) and incubated at 28° C for 7–10 days. A chunk of agar containing spores and mycelia from the sporulated culture is then used to prepare vegatative inoculum by inoculating a 6-liter Erlenmeyer flask containing 2 liters of inoculum medium having the following composition (grams/liter distilled water):

| Tomato pomace | 5.0 |
|---|---|
| Distillers soluble | 5.0 |
| OM peptone | 5.0 |
| Debittered yeast | 5.0 |
| Corn starch | 20.0 |
| CaCO$_3$ | 1.0 |
| K$_2$HPO$_4$ | 1.0 | pH is adjusted to 7.0 before autoclaving at 15–20 pound pressure for 45 minutes.

The innoculated medium is incubated for 72 hours at 28° C on a rotary shaker operating at 250 rpm.

Four liters of this culture are used to inoculate 60 gallons of the following medium in a 100 gallon fermentor (grams/liter tap water):

| | |
|---|---|
| Tomato pomace | 5.0 |
| Distillers soluble | 5.0 |
| OM peptone | 5.0 |
| Debittered yeast | 5.0 |
| Corn starch | 20.0 |
| CaCO₃ | 1.0 |
| K₂HPO₄ | 1.0 |
| Sag 4130 Antiform (Union Carbide) | 0.1 |

The pH of the medium is adjusted to 7.0 with NaOH before sterilization for 1¼ hours with 60 lb/in² steam.

The inoculated medium is aerated with compressed air at a rate of 3 cubic feet per minute and is stirred with agitators at 280 rpm. The fermentation is carried out at 28° C for 7 days.

Isolation

The 62 gallons of fermentation mash (90 hours) is mixed with 31 gallons of ethylacetate and lightly stirred. The solvent layer is separated and concentrated under reduced pressure to approximately 2 liters. The solvent concentrate is washed successively with 2 liters each of 1N HCl; 1N NaOH and water. The dried (Na₂SO₄) solvent is concentrated under reduced pressure to a heavy oil. The oil is dissolved in 1 liter acetonitrile and extracted with 1 liter of hexane four times.

The hexane layer is reextracted with 1 liter of methanol four times. The methanol extract is concentrated under reduced pressure to give a first crop and a second crop of crystalline lysocellin.

EXAMPLE 2

Fermentation

The lysocellin producing culture is grown and maintained on an Amidex agar slant having the following composition (grams/liter distilled water):

| | |
|---|---|
| Amidex | 10.0 |
| N-Z amine A | 2.0 |
| Beef extract | 1.0 |
| Yeast extract | 1.0 |
| CoCl₂ . 6H₂O | 0.02 |
| Agar | 20.0 |

The slant is inoculated with lysocellin producing culture and incubated at 28° C for 7-14 days. A chunk of agar containing spores and mycelia from the sporulated culture of the agar slant is then used to inoculate a 500 ml Erlenmeyer flask containing 100 ml sterilized inoculum medium having the following composition (grams/liter distilled water):

| | |
|---|---|
| Tomato pomace | 5.0 |
| Distillers soluble | 5.0 |
| OM peptone | 5.0 |
| Debittered yeast | 5.0 |
| Corn starch | 20.0 |
| CaCO₃ | 1.0 |
| K₂HPO₄ | 1.0 |

Adjust pH to 7.0 with NaOH before sterilization.

The inoculated inoculum medium is incubated at 28° C for 48-72 hours on a rotary shaker, operating at 250 rpm with a 2-inch stroke.

A 3 ml portion (3% v/v) of the resulting culture is then used to inoculate a 500 ml Erlenmeyer flask containing 100 ml sterilized production medium having the following composition (grams/liter distilled water):

| | |
|---|---|
| Glucose | 10.0 |
| Edible molasses | 20.0 |
| HySoy T | 5.0 |
| CaCO₃ | 2.0 |

Adjust pH to 7.2 before autoclaving.

The inoculated medium is incubated at 28° C~45° C for 2-6 days on a rotary shaker running at 250 rpm with a 2-inch stroke.

Isolation of the lysocellin from the fermentation mash may be accomplished by following the isolation procedure of Example 1 with adjustment made for the smaller amount of fermentation mash produced by the shake flask fermentation.

What is claimed:

1. A process for the production of the antibiotic lysocellin having the following formula

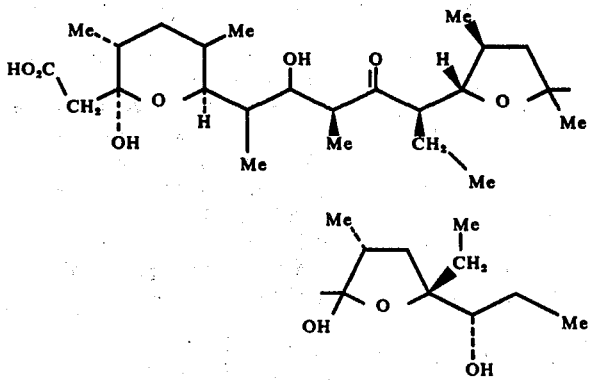

which comprises cultivating a strain of *Streptomyces longwoodensis* ATCC 29251 in an aqueous carbohydrate solution containing a nitrogenous nutrient under submerged aerobic conditions and thereafter isolating the lysocellin from said solution.

* * * * *